3,030,348
RECOVERY OF POLYOLEFINS FROM CATALYST
Ivor W. Mills, Glenolden, Pa., assignor to Sun Oil Company, Philadelphia, Pa., a corporation of New Jersey
No Drawing. Filed Feb. 4, 1958, Ser. No. 713,111
9 Claims. (Cl. 260—88.2)

This invention relates to a new process for the recovery of solid polymers of olefins from solid polymerization catalysts. More particularly, it relates to a process whereby substantially all the polymer can be removed from the catalyst without destroying any of the polymer and without deactivating the catalyst.

Ethylene, propylene, butene-1, and other alpha-olefins having up to about eight carbon atoms have heretofore been polymerized to solid polymers by contacting the olefin with a metal oxide catalyst, such as the oxides of chromium, molybdenum, tungsten, uranium and vanadium, usually supported on a difficultly reducible carrier material, such as alumina, titania, zirconia, silica gel and diatomite. These processes are usually carried out with the olefin dissolved in a liquid hydrocarbon reaction medium, such as isooctane, decahydronaphthalene, or xylene, although they may also be performed in the absence of such a reaction medium. The polymers prepared are predominantly high molecular weight solids. These polymers adhere to the catalyst, and serve to deactivate the catalyst as it becomes coated with the polymer. It is therefore the usual procedure to carry out the polymerization in the presence of a solvent for the polymer, such as the liquid hydrocarbons previously mentioned. Such a process is described in United States Patent Number 2,731,453, to Field et al. Although the temperatures normally used are such that the polymer would ordinarily be quite soluble in the solvent, it has been found that such processes are ineffective to completely remove the polymer from the catalyst. Field et al. found it necessary to periodically regenerate the catalyst by burning it with oxygen to remove the polymer, and then conditioning it with a reducing gas. Such a process of regeneration necessitates the removal of the reactor from the polymerization process for extended periods of time, and the destruction of a portion of the polymer.

It is an object of this invention to provide a new process for the removal of polymer from metal oxide catalysts. It is another object to provide a new process for the removal of polymers of olefins from metal oxide catalyst whereby none of the polymer is destroyed and the catalyst is not deactivated.

These and other objects are accomplished by contacting the catalyst and adhered polymer with a liquid organic polar material and a solvent for the polymer. The polymer is thereby easily dissolved, and the catalyst may be reused without regeneration.

In one embodiment of the invention, the supported metal oxide catalyst is in the form of a fixed bed through which a solvent such as decahydronaphthalene having absorbed ethylene, propylene, or other monomer is passed. A temperature of from about 130° C. to about 325° C. is normally used, since the polymers formed are quite soluble in the solvents at such temperatures. After a period of from one-half to about 10 hours, however, the catalyst becomes so coated with polymer that the polymerization rate is substantially decreased. The flow of olefin through the catalyst bed is then stopped, and the bed is contacted by a small amount of a polar material, such as acetone, whereupon the polymer is quickly dissolved in the solvent. After separating this solution from the catalyst, the catalyst is heated above the boiling point of the polar material in order to remove the latter.

The process of this invention is equally effective when the catalyst is in forms other than a fixed bed. For example, a slurry of powder, granules, etc. in the liquid reaction medium may be used. The catalyst is also sometimes employed in the form of lumps or shaped pellets. Polymer is easily removed and dissolved, regardless of the particular form of the catalyst, by the process of this invention.

Polymers of any of the olefins which are polymerized by the metal oxide catalysts are separated from the catalyst and dissolved by this process. Ethylene and propylene are the usual monomers, however butene-1, pentene-1, and other alpha-olefins having up to about 8 carbon atoms, and mixtures thereof, are also polymerized by the metal oxide catalysts.

The metal oxide catalysts which are effective to polymerize these olefins include the oxides of the metals of groups Va and VIa of the periodic table and of nickel. For example, the oxides of vanadium, niobium, tantalum, chromium, molybdenum, tungsten, and uranium are effective polymerization catalysts. Bauxite is also included among the effective catalysts. The catalysts are usually supported by a difficulty reducible carrier, such as alumina, titania, zirconia, silica gel, diatomite, and adsorptive carbon, however, such a carrier is not necessary to the polymerization process. The metal oxide catalysts are also usually prereduced as by hydrogen gas, before beginning polymerization, since the catalysts are usually more effective when the metal is at a valence state other than its highest valence state. As an alternative to prereduction, however, the unreduced metal oxide is used in conjunction with a reducing agent, such as the alkali metals, alkaline earth metals, metal hydrides, and metal borohydrides, during the polymerization reaction. Under certain conditions, and with certain of the metal oxides, the reduced state of the metal oxide is not necessary. For example, chromium trioxide is a very effective polymerization catalyst.

It is desirable to minimize as much as possible the contact of water, oxygen, carbon dioxide, or sulfur compounds with the catalyst, since these materials appear to deactivate it.

The olefin may be contacted with the catalyst either in liquid or in gaseous phase, or in solution in an inert hydrocarbon reaction medium which is a solvent for the polymer to be prepared. The solution method is preferred since a proportion of the polymer prepared will be dissolved immediately on formation, thereby prolonging the effectiveness of the catalyst before removal of the polymer therefrom is required. Suitable solvents include liquid hydrocarbons such as, for example, n-pentane, n-heptane, isooctane, decahydronaphthalene, tetrahydronaphthalene, xylene, cyclohexane, and the liquid olefins such as the n-hexenes, cyclohexene, octenes, hexadecenes, and the like.

When the polymerization reaction is carried out in the absence of a solvent for the polymer, it is necessary to periodically contact the catalyst and adhered polymer with a hot solvent to remove most of the polymer. When this process is no longer effective to expose the catalyst sufficiently for economical rates of polymerization, the catalyst and adhered polymer is contacted, by the process of this invention, with a polar organic liquid in the presence of a solvent, whereby the polymer is effectively removed from the catalyst. The polymerization process may then proceed without any further treatment of the catalyst.

Polar organic liquids are effective desorbents in the process of this invention. These include, for example, the aldehydes, such as acetaldehyde, and n-butyraldehyde; ketones, such as acetone, methyl ethyl ketone and diethyl ketone; alcohols including methanol, ethanol, propanol, ethylene glycol, and glycerol; and ethers, such as ethyl ether, isopropyl ether, dioxane, and propylene oxide. Other suitable polar materials include the nitriles, organic acids, imino compounds, and organic halides.

The amount of the polar material required is very small; usually no more than a volume equal to the volume of the catalyst plus the supporting material should be used, since large proportions decrease the solubility of the polymer in the solvent. Normally a volume ratio of polar material to catalyst plus support of from 1:10 to 1:1 should be used.

For effective removal of the polymer from the catalyst, the catalyst should be contacted by the polar material in the presence of the solvent, so that the polymer may be dissolved immediately. The catalyst and adhered polymer may first be wet with the polar material and then contacted with the solvent, or a mixture of the solvent and the polar material may be used. If the polymerization reaction is being carried out with a liquid reaction medium, as hereinbefore described, it is only necessary to add a small amount of the polar material thereto. The contacting is usually carried out at temperatures of from about 130° C. to 325° C., since the polymers prepared are soluble at such temperatures. Higher temperatures are unnecessary, and should usually be avoided, since degradation of the polymer may result. Atmospheric pressure is usually used, although higher pressures are required for some of the solvents and polar materials in order to maintain them in liquid phase.

The polymer solution is usually passed through a filter to remove any catalyst particles entrained. Other separation means, such as centrifuging, may however, be used. The polymer is then separated from the solvent, as by distillation or the addition of a large excess of a polar material. The polymers obtained may range from heavy, viscous oils to rubber-like or stiff solid plastics. Polymers prepared by this process are substantially free of contamination by catalyst.

The solid polymers may be molded, extruded, or otherwise fabricated to form liquid conduits, containers, films for wrapping foods, and as coatings for wire and cable. The liquid polymers are suitable for synthetic lubricants, or for additives to lubricants.

The following examples illustrate the process of this invention:

Example 1

A 1,000 cc. reactor is charged with 50 grams (about 50 cc.) of 100 mesh reduced molybdenum oxide catalyst supported on gamma-alumina, the total weight of molybdenum oxide being about 4 grams, and with 700 cc. of decahydronaphthalene. The reaction mixture is heated to 150° C., and, with stirring, propylene is injected at a pressure of 1,000 p.s.i.g. (pounds per square inch gauge). Polymerization begins immediately, as evidenced by a drop in pressure in the reactor. Additional propylene is injected from time to time to maintain the pressure. After 6 hours, polymerization has decreased substantially. The reactor is opened, and the decahydronaphthalene containing dissolved polypropylene is drained off. About 90 grams of a solid propylene are recovered from the solution. The reactor, containing the catalyst upon which solid polymer is adsorbed, is then charged with a mixture of 500 cc. of decahydronaphthalene and 50 cc. of acetone at a temperature of 150° C. and a pressure of 175 p.s.i.g. The mixture is then stirred vigorously for 10 minutes, and the resulting solution of polypropylene in the decahydronaphthalene is filtered to separate the catalyst particles. The catalyst particles are then heated to 70° C. to drive off the acetone, returned to the reactor, and used again to polymerize propylene. A substantially equivalent quantity of solid polypropylene is obtained in this second polymerization reaction.

The decahydronaphthalene containing polymer dissolved off the catalyst is evaporated until only about 100 cc. remain, and 200 cc. of acetone are added thereto, whereupon about 15 grams of solid white polypropylene is precipitated.

Example 2

Another batch of polypropylene was prepared by the method described in Example 1. Several washings with decahydronaphthalene at 150° C. fail to remove all the polymer from the catalyst, so that it is necessary to burn it off, and to regenerate the catalyst with hydrogen.

The invention claimed is:

1. Process for separating a solid polyolefin from its polymerization catalyst to which said polyolefin adheres during the course of its polymerization which comprises dissolving solid polyolefin in an inert organic solvent in the presence of a desorbent consisting essentially of acetone at a temperature of from about 130° C. to about 325° C., separating said catalyst from this solution and recovering solid active catalytic material substantially free of said polyolefin, said solvent and said polar substance, said catalyst being insoluble in both said solvent and acetone and comprising a metal oxide wherein said metal is selected from the group consisting of vanadium, niobium, tantalum, chromium, molybdenum, tungsten, uranium, aluminum and nickel, said solid polyolefin being a polymer of a monoenic alpha-olefin containing 2 to 8 carbon atoms which is insoluble in acetone per se, the volume ratio of acetone to said catalyst being in the range of from about 1:10 to 1:1.

2. A process as defined by claim 1 wherein the alpha-olefin is ethylene.

3. A process as defined by claim 1 wherein the alpha-olefin is propylene.

4. A process as defined by claim 1 wherein the alpha-olefin is butene-1.

5. A process as defined by claim 1 wherein the alpha-olefin is a mixture of ethylene and propylene.

6. A process as defined by claim 1 wherein the metal oxide is an oxide of molybdenum.

7. A process as defined by claim 1 wherein the metal oxide is chromium trioxide.

8. The process of claim 1 wherein said catalyst is separated from said solution by heating said catalyst above the boiling points of said solvent and said polar substance until substantially all of said solvent and said polar substance are removed from said catalyst.

9. Process for separating a solid polyolefin from its polymerization catalyst to which said polyolefin adheres during the course of its polymerization which comprises dissolving said polyolefin in an inert organic solvent in the presence of a desorbent consisting essentially of actealdehyde, n-butyraldehyde, acetone, methyl ethyl ketone, diethyl ketone, methanol, ethanol, propanol, ethylene glycol, glycerol, ethyl ether, isopropyl ether, dioxane, and propylene oxide, and separating said catalyst in solid form from said solution substantially free of said polyolefin, said solvent and said polar substance, said catalyst being insoluble in both said organic solvent and said polar substance and comprising a metal oxide wherein said metal is selected from the group consisting of vanadium, niobium, tantalum, chromium, molybdenum, tungsten, uranium, aluminum and nickel, said solid polyolefin being a polymer of a monoenic alpha-olefin having from 2 to 8 carbon atoms which is insoluble in said polar substance per se, the amount of said polar substance being insufficient to substantially reduce the solubility of said polyolefin in said solvent.

References Cited in the file of this patent

UNITED STATES PATENTS

| | | |
|---|---|---|
| 2,731,452 | Field et al. | Jan. 17, 1956 |
| 2,825,721 | Hogan et al. | Mar. 4, 1958 |
| 2,845,412 | Heyson | July 29, 1958 |
| 2,870,113 | Jones | Jan. 20, 1959 |
| 2,881,156 | Pilar et al. | Apr. 7, 1959 |
| 2,886,561 | Reynolds et al. | May 12, 1959 |
| 2,908,669 | Hagemeyer et al. | Oct. 13, 1959 |

OTHER REFERENCES

Richards: Trans. of Faraday Soc., vol. 42, 1946, p. 10–28.

"Chemistry of the Metal Chelate Compounds," Prentice & Hall Inc. (1952), N.Y., by Martell et al., pp. 451–458.